United States Patent [19]

Auchter et al.

[11] Patent Number: 5,173,523
[45] Date of Patent: Dec. 22, 1992

[54] AQUEOUS POLYMER EMULSIONS AND THEIR PREPARATION

[75] Inventors: Gerhard Auchter, Mannheim; Gerhard Neubert, Battenbert; Rolf Osterloh, Gruenstadt, all of Fed. Rep. of Germany

[73] Assignee: BASF Aktiengesellschaft, Ludwigshafen, Fed. Rep. of Germany

[21] Appl. No.: 481,680

[22] Filed: Feb. 20, 1990

Related U.S. Application Data

[63] Continuation of Ser. No. 205,812, Jun. 13, 1988, abandoned, which is a continuation-in-part of Ser. No. 938,799, Dec. 8, 1986, abandoned.

[30] Foreign Application Priority Data

Dec. 7, 1985 [DE] Fed. Rep. of Germany ....... 3543361

[51] Int. Cl.$^5$ ............................................. C08F 2/04
[52] U.S. Cl. .................... 524/461; 524/504; 524/854
[58] Field of Search ................ 524/460, 461, 854, 504

[56] References Cited

U.S. PATENT DOCUMENTS 4,616,058  10/1986  Yabuta et al. .................... 524/461

FOREIGN PATENT DOCUMENTS

| 1566442 | 5/1969 | France . |
| 2301578 | 9/1976 | France . |
| 1202155 | 8/1970 | United Kingdom . |
| 1530021 | 10/1978 | United Kingdom . |
| 1555868 | 11/1979 | United Kingdom . |

OTHER PUBLICATIONS

Chemical Abstracts (1975) 83:133527n.

*Primary Examiner*—John C. Bleutge
*Assistant Examiner*—Mark Sweet
*Attorney, Agent, or Firm*—Keil & Weinkauf

[57] ABSTRACT

Aqueous polymer emulsions whose polymer component essentially consists of

A) from 15 to 50% by weight of copolymer A of
 I from 25 to 98.5% by weight of a $C_1$–$C_{20}$-alkyl acrylate or methacrylate or a mixture of these esters,
 II from 0 to 60% by weight of a monomer I or a vinylaromatic,
 III from 1.5 to 15% by weight of a copolymerizable olefinically unsaturated carboxylic acid or one of its anhydrides which contain not more than 10 carbon atoms and
 IV not more than 30% by weight of other copolymerizable compounds and B) from 50 to 85% by weight of a solution polymer B consisting exclusively of the comonomers I, II and IV, obtainable by solution polymerization of one of these components (A) or (B) in an organic solvent, followed by solution polymerization of the other component in the resulting polymerization solution, dispersing the solution containing (A) and (B) in water with the addition of ammonia, and removal of the organic solvent, by distillation, to a concentration of less than 5% by weight, based on the amount of dispersion, a process for their preparation, and their use.

1 Claim, No Drawings

AQUEOUS POLYMER EMULSIONS AND THEIR PREPARATION

This application is a continuation of application Ser. No. 205,812, filed on Jun. 13, 1988, now abandoned, which is a continuation-in-part of application Ser. No. 938,799, filed on Dec. 8, 1986 now abandoned.

The present invention relates to physically drying aqueous polymer emulsions which form films which are particularly resistant to swelling in water, a process for their preparation and the use of these emulsions as binders for coating or impregnating rigid or flexible and porous or non-porous substrates. The novel emulsions contain less than 5, preferably less than 2, % by weight of organic solvents and are free of hydrophilic assistants.

Aqueous polymer emulsions as binders for a very wide variety of applications in the coating sector have long formed part of the prior art. As a rule, they are prepared from copolymerizable monomers with the aid of hydrophilic auxiliaries for ensuring stability of the emulsion, in general in the aqueous phase and with the use of initiators. A very wide variety of emulsifiers and/or protective colloids are generally used as such hydrophilic stabilizers. However, the content of such auxiliaries leads to the serious disadvantage that the dry coatings retain their hydrophilic character over a long period and therefore substantially lose their good film properties when exposed to moisture. Hence, no satisfactory solution to the problem has been found to date with regard to the use of conventional physically drying emulsions, for example for road marking or for corrosion protection in industrial plant construction or in ship building, where the dry films have to meet particularly high requirements in respect of water repellency and water resistance.

Attempts are constantly being made to prepare polymer emulsions by the polymer emulsion method without the aid of hydrophilic stabilizers. Such emulsions are described in, for example, German Laid-Open Applications DOS 3,313,922 DOS 3,123,598 and U.S. Pat. No. 4,151,143.

However, because of their limited stability, emulsions of this type are of little importance in practice. Like the assistant-containing emulsions, they require, for example, pigment wetting agents or pigment dispersants for incorporating the pigments and fillers to produce a paste in the preparation of pigmented or filler-containing coating materials. This necessitates an additional operation, and the assistants required for this purpose have an additional adverse effect on the stability of the coatings to swelling in water.

Moreover, such emulsions still have typical disadvantages of emulsion polymers, for example insufficient wet adhesion on a very wide variety of substrates.

The preparation of secondary dispersions in which the use of hydrophilic emulsifiers and/or protective colloids can be dispensed with is described in, for example, Japanese Patents 52 072-797, 51 145-529 and 55 040-809, and Belgian Patent 780,387 in K. Weigel, Wasserlosliche Lacke, Fachbereich Oberflächentechnik 7 (1969), No. 9-10, pages 182-184, in German Laid-Open Applications DOS 3,022,870, DOS 3,022,824 and DOS 3,212,238, in Japanese Preliminary Published Application 55 082-166 and in French Patent 1,384,246.

However, these emulsions too leave much to be desired with regard to their use as binders for coating and impregnating materials. As the sole binder, they do not possess adequate stability to permit the dispersing of pigments; additional dispersants have to be added. Furthermore, they are not sufficiently compatible with primary dispersions. The binder flocculates in the presence of pigments, and their polymer content is relatively low. Furthermore, their pH is highly viscosity-dependent and they exhibit unsatisfactory flow behavior. Moreover, the compatibility with highly polar solvents, such as ethyl glycol, methyl glycol or propylene glycol, is not completely satisfactory.

EP-A 0133 949 describes water-dilutable coating materials which consist of a water-emulsifiable combination of a solution of a physically drying polymer in organic solvents, a polymer which becomes water-soluble through salt formation, and, if required, a plasticizer. These combinations have the advantages of good wet adhesion, rapid drying and little sensitivity to alkalis; however, they too require pigment wetting agents and/or pigment dispersants in order to incorporate the pigments and fillers to form a paste. They also contain substantial amounts of organic solvents, which is undesirable from the point of view of environmental protection.

It is an object of the present invention to provide high quality emulsions which can be prepared very substantially without the use of organic solvents and which possess adequate stability in practice, in particular in respect of requirements which arise in incorporating pigments and fillers into the emulsions, for example in the preparation of paints, and which furthermore dry particularly rapidly.

We have found that this object is achieved, surprisingly, by a process in which two binder components are combined with one another while maintaining specific parameters.

The present invention relates to aqueous polymer emulsions whose polymer component essentially consists of A) from 15 to 50% by weight of a copolymer A of
  I from 25 to 98.5% by weight of a $C_1$–$C_{20}$-alkyl acrylate or methacrylate or a mixture of these esters,
  II from 0 to 60% by weight of a monomer I or a vinylaromatic,
  III from 1.5 to 15% by weight of a copolymerizable olefinically unsaturated carboxylic acid or one of its anhydrides which contain not more than 10 carbon atoms and
  IV not more than 30% by weight of other copolymerizable compounds and
B) from 50 to 85% by weight of a solution polymer B consisting exclusively of the comonomers I, II and IV, obtainable by solution polymerization of one of these components (A) or (B) in an organic solvent, followed by solution polymerization of the other component in the resulting polymerization solution, dispersing the solution containing (A) and (B) in water with the addition of ammonia, and removal of the organic solvent, by distillation, to a concentration of less than 5% by weight, based on the amount of emulsion, and a process for their preparation.

Where less than 10% by weight of vinylaromatics are present, the acid number of component (A) is preferably not more than 75 mg of KOH/g of solid and the acid number of the mixture of components (A) and (B) is preferably not more than 30 mg of KOH/g of solid, and where from 10 to 60% by weight of vinylaromatics are present, the acid number of component (A) is preferably not more than 95 mg of KOH/g of solid and the acid number of the mixture of components (A) and (B) is preferably not more than 50 mg of KOH/g of solid.

The present invention furthermore relates to the use of polymer emulsions prepared by the novel process as binders for coatings on rigid or flexible substrates and as adhesives.

Compared with the conventional products, the novel emulsions prepared according to the invention have the technical advantages that they can be prepared and further processed in the absence of solvents as well as completely in the absence of hydrophilic assistants, e.g. emulsifiers, protective colloids, wetting agents, pigment dispersants and aqueous thickeners. Coating materials, impregnating materials and adhesives based on these emulsions give films which possess extraordinary good stability to swelling in water and water repellency in particular directly after film formation from the emulsion of from the paints based on it. The emulsions are capable of ensuring good wetting of pigments and fillers at a pH greater than about 8.5. They are sufficiently stable to sharing to permit them to be used for milling pigments and fillers. Consequently, the hydrophilic pigment dispersions otherwise required can be dispensed with.

By subsequent neutralization with a base, e.g. ammonia, the emulsions prepared according to the invention can be brought to a form which exhibits structural viscosity or plastic flow. As a result, the presence of hydrophilic thickeners can be dispensed with. Another advantage of these emulsions compared with the conventional ones is that the surface-dried emulsions can readily be removed again with organic solvents, for example for cleaning the processing apparatuses.

A further advantage is the good compatibility with organic water-immiscible and water-miscible products, for example with plasticizers, solvents and other synthetic resins. This can be utilized to modify the properties of the novel products in one respect or another, for example the film hardness, the film flexibility and the rate of film formation.

Because the novel emulsions make it possible to avoid the use of hydrophilic assistants, they may furthermore be used to produce coatings which exhibit substantially better weather-resistance compared with the conventional ones.

Thus, it is possible to obtain coatings which, for example when exposed to moisture, no longer exhibit blushing and have substantially improved wet adhesion, gloss retention and resistance to chalking. A particular technical advantage is that, in contrast to the conventional emulsions, the good water repellancy is effective immediately after film formation. Compared with coatings obtained from conventional emulsions, the coatings can thus be exposed to weather effects at a substantially earlier stage without suffering permanent film damage. The products obtained according to the invention therefore ensure very much better protection from weather effects and are thus very useful for the corrosion protection of metals and the protection of other materials from external influences.

The emulsions prepared according to the invention can be mixed with many conventional emulsions as well as with polymer resins or polycondensate resins, such as urea/formaldehyde, phenol/formaldehyde or melamine/formaldehyde resins.

As a result of combination with the novel emulsions, it is often possible for the hydrophilic assistants, wetting agents, dispersants, thickeners and preservatives otherwise required to be dispensed with in the mixture too, and the water resistance of the coatings based on conventional emulsions is substantially improved.

The polymer of the novel emulsions is a homogeneous mixture and consists of from 15 to 50, preferably from 22 to 40, in particular from 25 to 35, % by weight of a component (A) and from 50 to 85, preferably from 60 to 78, in particular from 65 to 75, % by weight of a component (B), the sum of the percentages stated under (A) and (B) being 100.

Component (A) is a copolymer of

I from 25 to 98.5% by weight of a $C_1$-$C_{20}$-alkyl acrylate or methacrylate or a mixture of these esters, II from 0 to 60% by weight of a monomer I or a vinylaromatic, III from 1.5 to 15% by weight of a copolymerizable olefinically unsaturated carboxylic acid or one of its anhydrides which contains not more than 10 carbon atoms and IV not more than 30% by weight of other copolymerizable compounds, the sum of the percentages stated under (I) to (IV) being 100.

Component (B) is a copolymer consisting exclusively of the comonomers (I), (II) and (IV).

First, one of the two components (A) or (B) is polymerized in an organic solvent, and the other component is then polymerized in the resulting polymer solution.

Regarding the constituents of components (A) and (B), the following may be stated:

I Examples of suitable esters of acrylic acid or methacrylic acid with straight-chain or branched monoalkanols of 1 to 20 carbon atoms (I) are methyl acrylate, ethyl acrylate, isopropyl acrylate, methyl methacrylate, n-butyl acrylate, n-butyl methacrylate, isobutyl acrylate, isobutyl methacrylate, tert-butyl acrylate, 2-ethylhexyl acrylate, 2-ethylhexyl methacrylate, lauryl acrylate and mixtures of these. n-Butyl acrylate and methyl methacrylate are preferred.

(II) Examples of suitable vinylaromatics, which may replace some of the (meth)acrylates, are vinyltoluene and preferably styrene, which may replace not more than 60, preferably from 15 to 50, % by weight of the (meth)acrylates.

(III) Suitable components (III) are copolymerizable olefinically unsaturated carboxylic acids or carboxylic anhydrides of not more than 10 carbon atoms, e.g. acrylic acid, methacrylic acid, maleic acid, itaconic acid or the anhydrides or half esters of these dicarboxylic acids.

Prior to neutralization with ammonia, the anhydride groups of the copolymers can be converted to the corresponding half ester groups, for example by heating with glycol ethers or alcohols of 1 to 8 carbon atoms. Examples of such alcohols or glycol ethers are ethanol, isopropanol, butanol and butylglycol.

Preferred components (III) are acrylic acid, methacrylic acid and itaconic acid. Component (III) is present as copolymerized units in copolymer (A) in amounts of from 1.5 to 15, preferably from 5 to 13, % by weight; from 5 to 12% by weight of acrylic acid and/or methacrylic acid are particularly preferred.

(IV) Components (IV) comprises further copolymerizable olefinically unsaturated compounds not mentioned under I to III. These are, for example, mono(meth)acrylates of alkanediols, such as hydroxyethyl and hydroxypropyl (meth)acrylate and butanediol mono(meth)acrylate, (meth)acrylamide and/or (meth)acrylonitrile. These monomers can, if required, be used for obtaining special properties.

Other components (IV) which may be present are vinyl ethers, vinyl esters, diesters of maleic acid, itaconic acid, citraconic acid or mesaconic acid with monoalcohols of 1 to 20 carbon atoms which may contain ether or thioether groups. Other components (IV) which may be used are monoolefins of 3 to 20 carbon atoms, such as propene, butene, pentene, hexene or isobutene, and diolefins, such as butadiene and isoprene.

It is known that polar functional groups, as may be present in component (IV), e.g. hydroxyl or ether groups, additionally stabilize polymer emulsions. However, the novel emulsions do not require such additional stabilization. Polar groups present in component (IV) may, however, have an adverse effect on the water resistance of the films obtained from the novel emulsions. In the preferred embodiment of the invention, component (IV) is therefore not present.

The sum of the percentages stated under (I) to (IV) is 100.

Component (B) of the polymer does not contain constituent (III).

On the basis of the composition of the components (A) and (B), the following may be stated:

Considered by itself, component (A) is a polymer which is rendered water-dilutable after partial or complete neutralization with ammonia and which, because of the relatively small number of carboxyl groups present, is not water-soluble in the conventional sense but gives finely divided emulsions in water.

Regarding the water resistance of the films obtained from the novel emulsions, it is important that component (A) alone gives films possessing good stability to swelling in water.

The amount of constituent (III) used for (A) is therefore advantageously chosen so that (A) has an acid number, according to DIN 53,402 and bassed on solid, of not more than 75, preferably from 54 to 65, mg of KOH/g when not more than 10% by weight of a vinylaromatic is present, and not more than 95, preferably from 62 to 94, mg of KOH/g when from 10 to 60% by weight of vinylaromatic is present. In the case of higher acid numbers, (A) may not always form a film which is stable to swelling in water.

Considered by itself, component (B) is not water-dilutable and moreover is free of monomers containing acidic groups.

The above technical advantages of the novel emulsions are particularly evident when the ratio of (A) to (B) is chosen so that the acid number of the mixture of (A) and (B) is not more than 30, preferably from 12 to 27, mg of KOH/g where not more than 10% by weight of a vinylaromatic is present, and not more than 50, preferably from 20 to 47, mg of KOH/g when from 10 to 60% by weight of a vinylaromatic is present.

It is surprising that the novel emulsions are stable at such low total acid numbers without additional stabilization and also show no tendency to form two phases even after storage for several months.

The comonomer composition of (I) in (A) and (B) can be the same but may be chosen to be different in order to modify the properties of the emulsion in a selective manner in one respect or another, for example in order to alter the minimum film forming temperature, the film flexibility or the film hardness.

The emulsions according to the invention have a particularly wide range of applications when the polymer hardness is chosen so that the emulsions dry to give transparent, non-tacky films at room temperature without further additives. The measures required for this purpose, usually a suitable combination of hardening and plasticizing monomers, are known to the skilled worker.

The glass transition temperatures of components (A) and (B) should not differ too greatly, preferably by no more than 30° C., since otherwise (A) and (B) may not give a homogeneous mixture.

The process of solution polymerization is familiar to the skilled worker so that there is no need for the conditions which are suitable for the particular components to be described here in detail.

The polymerization is advantageously carried out in the presence of from 0.3 to 5.0, preferably from 0.5 to 3.0, % by weight, based on the sum of the monomers (I) to (IV), of free radical initiators, such as azobiscarboxamides, azobiscarboxonitriles or peroxides, in general at from 50° to 150° C., preferably from 80° to 130° C., in the presence or absence of regulators, such as mercaptoethanol, tert-dodecylmercaptan or diisopropylxanthogen disulfide, which may be present in amounts from 0 to 3% by weight, based on the sum of the monomers (I) to (IV).

Suitable organic solvents are in principle all those which are conventionally used in coating technology and which dissolve the novel polymer. It is not necessary for a solvent to be present in order to achieve stabilization and the advantageous performance characteristics of the novel emulsions, and, for reasons of environmental protection, it is therefore reasonable to choose a very low solvent content.

Solvents which are advantageously used are those which, because of their boiling point and/or azeotrope formation with water, can easily be distilled off from the novel emulsions. Butanol, isobutanol, propanol, ethanol and toluene are particularly preferred.

It is not critical whether component (A) is polymerized first, followed by component (B), or the reverse procedure is adopted. In a preferred embodiment of the invention, however, component (A) is polymerized first, followed by component (B). In the preparation according to the invention, the two components give a homogeneous mixture. The component prepared first is very substantially polymerized, i.e. to an extent of more than 95%, preferably more than 99%, before the polymerization of the second component is begun.

Residual monomers from the first component, in particular those containing acidic groups, would alter the composition of the second component, leading to a deterioration in the performance characteristics, in particular to increased dependence of the viscosity on pH.

Emulsions which are produced, in a similar manner to the novel ones, from two polymers (A) and (B) which have been prepared separately and then mixed likewise exhibit disadvantageous performance characteristics, such as lower stability and more unfavorable flow behavior. Furthermore, mixing would entail an additional procedure.

The polymerized copolymer solutions (resulting mixture of components (A)+(B)) are converted to emulsions either by mixing in ammonia and diluting with water or by stirring the polymerized copolymer or the polymerized copolymer solution slowly into an aqueous ammonia solution.

Depending on the solvent content of the polymer composed of (A) and (B), the emulsions thus obtained may contain more than the amounts of organic solvents permitted according to the invention. Such an excess is, if required, removed from the emulsions by distillation, preferably under reduced pressure, and the solvent can be recovered.

The degree of neutralization of the novel emulsions is from 10 to 150%, preferably from 15 to 100%, particularly preferably from 40 to 70%. The pH of the emulsions can accordingly be from about 6.8 to 10, preferably from 7.0 to 9.0.

To achieve certain effects, a small amount, advantageously not more than 25, preferably not more than 10, % by weight, of the ammonia required for the neutralization may be replaced with organic amines, in particular triethylamine. Such additives may increase the water swellability and the water permeability of the coatings.

The polymer content of the novel emulsions is advantageously chosen so that the viscosity is advantageous for the processor. The polymer content is therefore from 40 to 60, preferably from 45 to 55, % by weight.

The emulsions prepared according to the invention can be used as sole binders for the preparation of coating and impregnating materials. No dispersants are required for incorporating pigments and fillers, as are necessary, for example, for the preparation of conventional emulsion coatings. The emulsions according to the invention can be pigmented simply by stirring in the pigments and fillers.

For the preparation of coating materials, other auxiliaries conventionally used in coating technology, for example antifoams, wetting agents, antisetting agents, thixotropic agents, thickeners, lubricants and plasticizers may also be used in addition to pigments and fillers, such as titanium dioxide, iron oxides, chromium oxides, barium sulfate, carbon black, calcite, dolomite, talc, aluminum bronze and organic pigments. Even water-immiscible plasticizers, e.g. chloroparaffins, can be used as plasticizers for the novel emulsions.

Polar assistants are not required and may furthermore have an adverse effect on the water resistance of the coatings produced from the emulsions according to the invention.

The coating and impregnating materials produced from the novel secondary dispersions can be processed by a conventional method, such as painting, spraying, casting, immersion or roller-coating with a roller covered with a hard or soft material. The novel products are used, for example, as clear coats and pigmented coatings for protecting various substrates, e.g. steel or other metals, mineral materials, such as masonry, concrete or asbestos cement, fiber-containing or organic materials, such as wood, board, textiles or tarred board, existing coatings based on other materials, and plastics, from atmospheric and other effects. They are also used, for example, for compacting or adhesively bonding absorptive mineral or fiber-containing substrates or rendering them water repellent, and as road marking paints.

EXAMPLE 1

In a conventional stirred apparatus, 120 g of ethanol were initially taken and a mixture of 228 g of styrene, 300 g of butyl acrylate, 72 g of acrylic acid, 18 g of tert-butyl peroctoate and 90 g of ethanol was run in uniformly in the course of 2.5 hours at 80° C., and polymerization was carried out for a further 2 hours at this temperature.

Thereafter, a mixture of 228 g of styrene, 312 g of butyl acrylate, 18 g of tert-butyl peroctoate and 90 g of ethanol was run in over 2 hours, likewise at 80° C., and polymerization was carried out for a further 4 hours. 63.3 g of 25% strength by weight aqueous ammonia solution and 1100 g of water were added, and an ethanol/water mixture was distilled off under reduced pressure. During the distillation, the amount of fresh water required to obtain the desired final solids content was run in.

The resulting emulsion had a long shelf life and was characterized by the following data:

| | |
|---|---|
| Content of nonvolatile constituents: | 46.7% |
| Acid number (100% strength by weight): | 43.5 mg of KOH/g |
| Amine number (100% strength by weight): | 27.2 mg of KOH/g |
| pH: | 8.1 |
| Ethanol content: | 0.8% by weight |

EXAMPLE 2

First, two mixtures were prepared.

Mixture I consisted of 228 g of methyl methacrylate, 102 g of butyl acrylate and 30 g of acrylic acid, while mixture II consisted of 1.7 g of tert-butyl perbenzoate, 1.7 g of tert-butyl peroctoate and 34 g of isobutanol.

In a conventional stirred apparatus, 208 g of isobutanol and half the amount, in each case, of mixtures I and II were initially taken and refluxed. Thereafter, the remainder of mixtures I and II were simultaneously added dropwise in the course of 20 minutes, after which a mixture of 3 g of tert-butyl perbenzoate and 30 g of isobutanol was introduced in the course of 30 minutes. Polymerization was then continued for 2 hours at the reflux temperature (*).

A mixture of 492 g of methyl methacrylate and 348 g of butyl acrylate and a mixture of 5.5 g of tert-butyl peroctoate, 5.5 g of tert-butyl perbenzoate and 110 g of isobutanol were then simultaneously added dropwise in the course of 2 hours at the reflux temperature, after which a mixture of 4.8 g of tert-butyl peroctoate and 48 g of isobutanol was added in the course of 30 minutes.

Polymerization was continued for 2 hours and the mixture was cooled to 65° C. 24.7 g of 25% strength by weight aqueous ammonia solution were added, followed by 1040 g of water.

An isobutanol/water mixture was then distilled off under reduced pressure until isobutanol no longer passed over. Finally, the emulsion was brought to a solids content of 45% by weight with water. The emulsion obtained still contained 0.7% by weight of isobutanol and had a pH of 7.7, an acid number (according to DIN 53,402) of 19.3 mg of KOH/g, an amine number (according to DIN 53,176) of 11.6 mg of KOH/g and a Fikentscher K value of 36.

COMPARATIVE EXAMPLE

The procedure described in Example 2 was initially followed, up to the point indicated by (*).

In another apparatus, 200 g of isobutanol were initially taken and a mixture of 492 g of methyl methacrylate and 348 g of butyl acrylate and a mixture of 5.5 g of tert-butyl peroctoate, 5.5 g of tert-butyl perbenzoate and 110 g of isobutanol were simultaneously added dropwise in the course of 2 hours at the reflux temperature, followed by a mixture of 4.8 g of tert-butyl peroctoate and 48 g of isobutanol in the course of 30 minutes. Polymerization was carried out for a further 2 hours, and the resulting polymer solution was then combined with the polymer solution first prepared.

24.7 g of 25% strength by weight aqueous ammonia solution and 840 g of water were then added at 65° C., after which the procedure described in Example 2 was followed. The emulsion obtained gave dull films containing specks at room temperature and formed two phases on standing after only a few days.

EXAMPLE 3

A mixture of 277 g of isobutanol, 192 g of methyl methacrylate, 252 g of butyl acrylate, 56 g of methacrylic acid, 2.2 g of tert-butyl peroctoate and 2.2 g of tert-butyl perbenzoate was initially taken.

The mixture was heated at the boil and polymerized for 3 hours. The conversion and the polymerization reaction, determined from the solids content, was 99.7%.

A mixture of 640 g of methyl methacrylate, 460 g of butyl acrylate, 7.4 g of tert-butyl peroctoate, 7.4 g of tert-butyl perbenzoate and 192 g of isobutanol was then run in over 3 hours, and polymerization was continued for a further 3 hours.

The mixture was cooled to 70° C., and 33 g of 25% strength by weight of aqueous ammonia solution were added, followed by 1300 g of water.

an isobutanol/water mixture was then distilled off under reduced pressure until isobutanol no longer passed over. Finally, the solids content was brought to 48% by weight with water. The emulsion formed had a long shelf life and was characterized by the following data:

| | |
|---|---|
| Acid number (100% strength by weight): | 22.9 mg of KOH/g |
| Amine number (100% strength by weight): | 11.5 mg of KOH/g |
| pH: | 7.5 |
| Viscosity: | 750 mPa · s |
| Isobutanol content: | 1.9% by weight |

EXAMPLE 4

Two mixtures were prepared:

Mixture I consisted of 228 g of methyl methacrylate, 105 g of butyl acrylate and 27 g of itaconic acid. Mixture II consisted of 1.7 g of tert-butyl peroctoate, 1.7 g of tert-butyl perbenzoate and 34 g of isobutanol. 208 g of isobutanol and half the amount, in each case of mixtures I and II were initially taken.

The initially taken substances were heated at the reflux temperature, and the remainder of mixtures I and II were uniformly added dropwise in the course of 20 minutes. Polymerization was continued for 2 hours at the reflux temperature.

A mixture of 480 g of methyl methacrylate and 360 g of butyl acrylate and a mixture of 5.5 g of tert-butyl peroctoate, 5.5 g of tert-butyl perbenzoate and 110 g of isobutanol were then run in at the reflux temperature in the course of 2 hours, followed by a mixture of 4.8 g of tert-butyl perbenzoate and 48 g of isobutanol in the course of 30 minutes.

The procedure described in Example 2 was then followed, except that 31.1 g of 25% strength by weight aqueous ammonia solution were used and the solids content was brought to 49% by weight. The emulsion had a pH of 8.2, an acid number (100% strength by weight) of 16.2 mg of KOH/g, an amine number (100% strength by weight) of 8.8 mg of KOH/g and a viscosity of 600 mPa.s, measured using a rotation viscometer.

Testing the coating properties

The emulsions of Examples 1 to 4 were applied, in each case as 0.15 mm thick wet layer, onto glass plates, PVC film, deep-drawn sheet metal and hot-galvanized sheet metal. The initially dull films dried in the air in a few minutes to give transparent, non-tacky coating films. In contrast to coating films of known commercial primary dispersions having a similar polymer composition, these films were highly water-repellent directly after drying and, even after prolonged exposure to water, still exhibited good stability to swelling and blushing and good adhesion. After films which had been dried for 16 hours at 50° C. were stored in water for 7 days, the water absorption was less than 3% by weight. The films remained transparent and still exhibited good adhesion. The deep-drawn sheet metal suffered no corrosion under the coating film.

45 g of each of the emulsions of Examples 1 and 2 were brought to a pH of about 9.5 with 20 g of water and concentrated ammonia. 50 g of rutile and 10% of barite were dispersed in these emulsions for about 15 minutes under high shear stress. The pigment suspensions were mixed with a further 170 g of the same emulsions from Examples 1 and 2 respectively, and 10 g of benzenesulfonic acid n-butylamide as a plasticizer, and diluted with water to a viscosity of about 1 Pa.s. The resulting gloss coats had a long shelf life and their coating films possessed similar properties to the corresponding unpigmented emulsions. In particular, the gloss coat obtained from the emulsion of Example 2 was distinguished by excellent gloss retention and resistance to chalking during accelerated weathering and open-air weathering.

The emulsion of Example 1 was brought to a pH of about 9.5 with concentrated ammonia to give a pasty composition which, when mixed with stone chips and applied as a thick coat on mineral materials, did not run off while drying on vertical surfaces.

We claim:

1. A process for the preparation of an aqueous polymer emulsion, wherein the polymer components of said emulsion consist of
   A) from 15 to 50% by weight of a polymer (A) of
      I from 25 to 98.5% by weight of esters of acrylic acid or methacrylic acid with straight chain or branched monoalkanols of 1 to 20 carbon atoms or a mixture of these esters,
      II from 0 to 60% by weight of a vinylaromatic,
      III from 1.5 to 15% by weight of a copolymerizable olefinically unsaturated carboxylic acid or one of its anhydrides which contains not more than 10 carbon atoms and
      IV not more than 30% by weight of mono(meth)acrylates of alkanediols and
   B) from 50 to 85% by weight of a solution polymer (B) of I, II and IV, comprising the solution polymerization of component (A) or (B) in an organic solvent, followed by solution polymerization of the other component in the resulting polymerization solution, adding water and ammonia to the thus obtained solution and removing the organic solvent, by distillation, to a concentration of less than 5% by weight, based on the amount of dispersion.

* * * * *